G. W. EDDY.
Stop-Valve.
No. 166,083. Patented July 27, 1875.
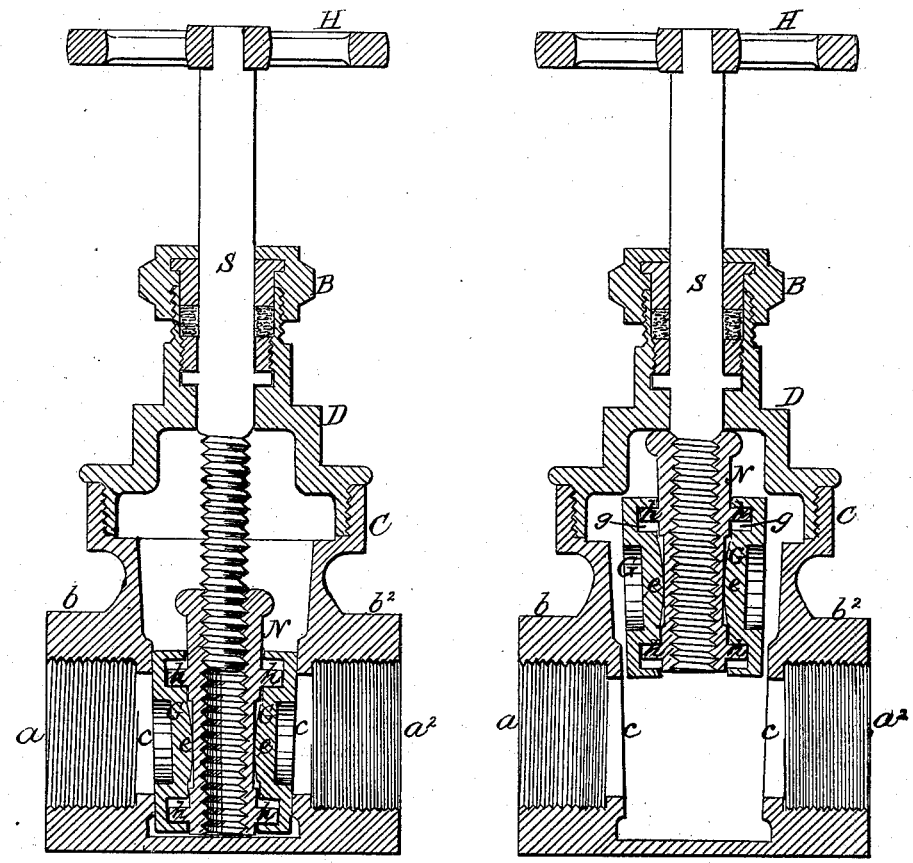
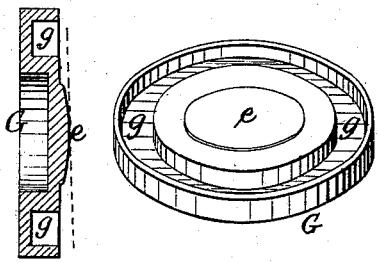
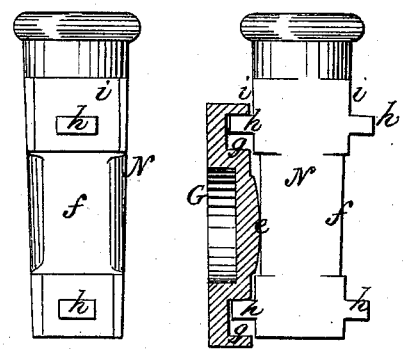
WITNESSES
John E. Laing
J. H. Rutherford
INVENTOR
Geo. W. Eddy
By Johnson & Johnson
his Attys.

UNITED STATES PATENT OFFICE.

GEORGE W. EDDY, OF WATERFORD, NEW YORK, ASSIGNOR TO LYMAN K. EDDY, OF PHILADELPHIA, PENNSYLVANIA.

IMPROVEMENT IN STOP-VALVES.

Specification forming part of Letters Patent No. 166,083, dated July 27, 1875; application filed May 25, 1875.

*To all whom it may concern:*

Be it known that I, GEORGE W. EDDY, of Waterford, in the county of Saratoga and State of New York, have invented certain new and useful Improvements in Stop-Valves; and I do hereby declare that the following is a full, clear, and exact description thereof, which will enable others skilled in the art to which it pertains to make and use the same, reference being had to the accompanying drawing, and to the letters of reference marked thereon, which form a part of this specification.

The valve is designed for all fluids requiring a stop-valve, or for steam and gas, and the object of the improvements I have made is to obtain a cheap, durable, and effective valve, and one that will lock with a perfect tightness, and remain so for a greater length of time than any valve of which I have knowledge. This advantage I accomplish by providing the inner faces of the gates or disks with convex centers for combined action and co-operation with flattened sides of a wedge-nut or sleeve through which the screw-stem works, the object of which convex centers being to obtain a slightly rocking and equalized adjustment of the gates, without any fixed or jointed connections, and which allow the force of the wedge to be exerted in a line with the centers of the gates.

A further feature of my invention consists in constructing the valves with annular grooves or shoulder-bearings on their inner faces, in combination with projections from the wedge nut or sleeve operating loosely in the grooves or upon the bearings on the gates, the functions of such projections being to carry the gates to their seats and outward to open the passage-way, while the annular grooves allow the gates to have a circular adjustment, so that the gates and their seats will not be so liable to wear irregularly, or to roughen their surfaces and cause leakage.

A circumferential annular rim forms a bearing on the face of each gate for action with flat surfaces at the top of the wedging sleeve-nut to hold the nut from turning and yet allow the gates to turn by their annular grooves as the stem is operated.

In the accompanying drawings, Figure 1 represents a section taken through the gates open; Fig. 2, a similar section with the gates closed; Fig. 3, a view in perspective and section of one of the gates, showing the annular groove and the center convex bearing; and Fig. 4 a view of the nut or sleeve, with its side bearings and gate-suspending projections. The shell or case C may be of any suitable construction, and provided with the usual dome D, operating-spindle S, and stuffing box B, for completing the valve for use. The valve has the usual passageway $a\ a^2$, which is closed and opened by the gates at will. The case has the usual length of sleeves $b\ b^2$, by which the pipes are connected, and the inner end of each of these sleeves is provided with a suitable projecting seat, $c$, for the gates G. These gate-seats $c$ may be parallel or converge toward the base of the case. I prefer the latter form, so that as the gates commence closing they enter the widest space between the seats, and rest against them firmly during their closing movement without scraping or cutting their seats, their action being such as to run close and parallel with the seats when closing, freeing them from all foreign matter, and yet causing the least possible abrasion or marring of the active surfaces of the gates and their seats.

The gates G are circular disks of sufficient body to prevent any undue liability to spring under the greatest pressure. These disks are constructed with center convex bearings $e$ on their inner faces, so as to bear directly against the flattened wedge-surface $f$ on each side of the nut or sleeve N, of the operating-spindle S, and allow the disks to have a slightly-rocking movement upon their center bearings $e$, thereby causing the gates to press equally upon all parts of their seats. The gate or gates are held upon the nut or sleeve N by means of an annular groove, $g$, formed upon the inner face of each gate, and near its circumference, or upon the circumference of the gates, into which projections $h$ from the nut or sleeve enter, and upon which the gates are hung and held in proper positions. These projections $h$ are made of less thickness than the width of the grooves $g$, for the purpose of allowing the nut or sleeve to have a movement independent of the gates, so that the latter may be powerfully forced against the seats $c$ after the movement of the gates has ceased, by means of the wedging-surfaces $f\,f$ of the nut, bearing against the convex centers $e$ of the gates. This arrangement of annular grooves $g$ for hanging the gates upon the projections of the nut or sleeve allows the gates to be hung upon the nut in any position or part of their circumference, and to give them entire freedom to roll upon the hanging projections in either direction, through any part or the whole of a circle, as they are moved in and out against their seats, and thereby greatly reduce the friction of the contacting-surfaces, and, moreover, allows the gates to be both opened and closed more easily.

I have shown and described a gate with a grooved face, within which projections work, but it is obvious that the gates can be moved by the stem by these projections acting against the opposite sides of an annular shoulder-bearing on the gates. To prevent the nut or sleeve from turning with the screw-stem S, in opening and closing the valve, I form side bearings $i\,i$ upon the two opposite sides of the nut or sleeve, so that the gates will have a bearing thereon at or near their circumference, and thus prevent the nut from turning with the screw-stem. This, however, may be accomplished by locating the annular groove on the whole or part of the circumference of the gates and forming a corresponding projection on the nut.

The screw-stem S works within the nut or sleeve N, and the stem is turned by its hand-wheel H, or other common device, to operate the gates. I have described the convex bearings $e$ as being upon the center of the inner faces of the gates or disks, but it is obvious that these convex bearings may be formed upon the two opposite sides of the nut or sleeve, and produce similar results. The nut or sleeve, where it has its convex bearing against the gates, is made of wedge form on its opposite sides, and these wedge-faces must be of sufficient length and width to receive the full size of the convex bearings in their slightly-rocking motion, and also to allow for the movement of the nut or sleeve, after the gates have ceased their sliding movement, in order to press the gates hard upon their seats.

If desired to economize in the construction of this stop-valve, it may be made to operate in a satisfactory manner by the employment of one gate only, the place of the other gate being supplied with an entire disk similar to the gate, or a strong cross-bar moving with the nut and the opposite gate. This disk or bar, when used, must have bearings opposite to the gate-bearings. I have essayed this, my invention, in various ways, but believe the plan described the best.

The following is claimed as new in stop-valves, namely:

1. In a stop-valve the gate or gates G thereof, provided with a convex central projecting bearing, $e$, and combined for operation with the wedging sleeve-nut N, to equalize the bearing of the gates upon their seats $c$, without fixed or jointed connections, substantially as herein set forth.

2. The gates provided with the annular grooves $g$, and combined for operation with projections $h$ upon the wedging sleeve-nut N, whereby the gates are suspended and allowed to turn in either direction upon their points of suspension, substantially as herein set forth.

3. The combination, with the wedging nut or sleeve N, provided with the side projections $h\,h$, of the gate-grooves $g$ of larger cross-section throughout their circle than the projections, whereby the gates may turn and the nut have a limited movement within any part of the circular grooves of said gates, independent thereof, for the purpose stated.

4. The circumferential annular-rim bearings of the gates, combined with the flat surfaces $i\,i$ at the top of the wedging-sleeve N, whereby the said gates are free to turn, and the nut held from turning, as described.

In testimony that I claim the foregoing as my own, I have affixed my signature in presence of two witnesses.

GEO. W. EDDY.

Witnesses:
A. E. H. JOHNSON,
J. W. HAMILTON JOHNSON.